(12) United States Patent
Dizdarevic et al.

(10) Patent No.: US 11,891,171 B1
(45) Date of Patent: Feb. 6, 2024

(54) AIRCRAFT WING WITH TIPLET

(71) Applicants: Faruk Dizdarevic, Laguna Hills, CA (US); Mithad Dizdarevic, Anaheim, CA (US)

(72) Inventors: Faruk Dizdarevic, Laguna Hills, CA (US); Mithad Dizdarevic, Anaheim, CA (US)

( * ) Notice: Subject to any disclaimer, the term of this patent is extended or adjusted under 35 U.S.C. 154(b) by 0 days.

(21) Appl. No.: 18/208,309

(22) Filed: Jun. 12, 2023

(51) Int. Cl.
*B64C 3/14* (2006.01)
*B64C 3/56* (2006.01)

(52) U.S. Cl.
CPC .............. *B64C 3/14* (2013.01); *B64C 3/56* (2013.01); *B64C 2003/147* (2013.01)

(58) Field of Classification Search
CPC ....... B64C 3/14; B64C 3/56; B64C 2003/147; B64U 20/50
See application file for complete search history.

(56) References Cited

U.S. PATENT DOCUMENTS

| | | | |
|---|---|---|---|
| 7,243,881 B2 * | 7/2007 | Sakurai | B64C 9/16 244/212 |
| 7,424,350 B2 * | 9/2008 | Speer | B64C 13/24 244/225 |
| 8,056,852 B1 | 2/2011 | Dizdarevic | |
| 8,544,800 B2 * | 10/2013 | Stuhr | B64C 23/069 244/199.4 |
| 10,640,212 B1 | 5/2020 | Dizdarevic | |
| 2003/0197097 A1 | 10/2003 | Wakayama | |
| 2012/0049010 A1 * | 3/2012 | Speer | B64C 23/069 244/45 R |
| 2014/0197280 A1 | 7/2014 | Smith | |
| 2021/0009256 A1 * | 1/2021 | Ahlstrom | B64C 27/463 |
| 2021/0387715 A1 * | 12/2021 | Moxon | B64C 3/14 |
| 2023/0092281 A1 | 3/2023 | Rawdon | |

FOREIGN PATENT DOCUMENTS

| | | |
|---|---|---|
| CN | 102530236 | 7/2012 |
| CN | 108367807 | 11/2016 |
| RU | 2007103109/11 | 1/2007 |

OTHER PUBLICATIONS https://arc.aiaa.org/doi/abs/10.2514/6.2022-3517. Accessed Jun. 10, 2023.

* cited by examiner

Primary Examiner — Rodney A Bonnette (57) ABSTRACT

The present invention "Aircraft Wing with Tiplet" reflects a wing with two distinct sections including inner section for maximized lift production with long chords, high taper, and ultra-thin airfoils for substantial profile drag reduction, as well as a "tiplet" section with minimized area and maximized span to minimize aspect ratio penalty from the standpoint of increased induced drag mitigation due to large inner section lifting area. Long chords and large area of inner section are feasible from the standpoint of flight safety with the application of airfoils with forward center of pressure that provide for dynamic stability of aircraft in flight.

5 Claims, 9 Drawing Sheets

FIG. 1

--Prior Art--

--Prior Art--

--Prior Art--

--Prior Art--

--Prior Art--

--Prior Art--

AIRCRAFT WING WITH TIPLET

FIELD OF THE INVENTION

The present invention "Aircraft Wing with Tiplet" relates to a custom shape and size of aircraft wings to maximize aerodynamic and structural efficiency, as well as flight safety.

BACKGROUND OF THE INVENTION

Aircraft wings are the most powerful design element impacting aerodynamic efficiency, flight safety, total aerodynamic lift and drag, as well as aircraft weight, directly or indirectly with their planform shape, area size, the shape of wing airfoils, and their position relative to aircraft gravity center including their connection with other aircraft sections and components.

Unfortunately, for the nearly past 120 years of very intensive and expensive research and development of aircraft, especially during the past 50 years, the general wing theory as it relates to shape and size of wings, their planform, and airfoils was limited mainly on the improvement of airfoils in terms of maximization of lift-to-drag ratio. However, such airfoils have aft position of center of pressure, which unfortunately prevented the development of wings with long chords to maximize wing area, minimize profile drag, and increase structural efficiency as such position of center of pressure and its change with the change of attack angle would jeopardize the flight safety due to increased movements of the center or pressure relative to gravity center with long wing chords that a small tailplane would not be able to compensate, which is critical for commercial air transport. Increased lift coefficient of such airfoils together with limited wing area and chord lengths are resulting with a long chain of negative side effects including minimized wing area and inability to carry more payload or fly at higher altitudes with decreased air density for the improvement of aerodynamic efficiency. Also, the higher lift coefficient is increasing induced drag with its square value, whereas in combination with limited wing area substantially increasing the specific wing loading.

Additionally, aircraft required a wide wing span for the increase of aspect ratio and reduction of induced drag, especially at lower speeds. Considering that wings need to carry a heavy weight of the entire aircraft, such slender wings with minimized area are resulting with high specific loading, whereby generating a high bending momentum across the wing span, and especially in the wing root. On the other hand, short wing chords with their square value are reducing the structural resistance to bending, which requires both increased thickness-to-chord (t/c) ratio and the thickness of wing airframe components including wing skin. Increased wing skin thickness is increasing the wing's weight, whereas increased t/c ratio is increasing compression and wave drag at higher subsonic and transonic speeds, thus limiting the economical flight speed and cruise altitudes. The reduced economical speed is increasing the flight time and total required energy, whereas reduced economical cruise altitude is increasing all types of drag across the entire aircraft wetted area due to higher air density.

Limited wing area with limited chord lengths at low speeds require heavily mechanized, long, and highly deflected leading and trailing edge surfaces for extra lift production for reduction of takeoff and landing speed due to a low wing area and absence of ground effect, which is used by virtually all fliers in nature by spreading their wings and tails. Heavily mechanized surfaces across leading and trailing edge are additionally substantially increasing wing weight. High takeoff speed on limited runway lengths requires a high level of acceleration with higher takeoff thrust, whereby requiring heavy engines that participate about 7% in gross takeoff weight. During landing, bulky and heavy wing-podded engines require longer and strengthened landing gears to protect them from high impact against rough landing at high landing speeds, which further requires the strengthening of undercarriage, which together with landing gears participate in up to 4% of gross takeoff weight.

Short wing chords necessitated highly concentric joints between wings and fuselage made by heavy metal alloys to withstand enormous forces along short wing root chords including huge momentums generated by wide-span wings, which is additionally increasing the weight of both wings and fuselage in order to be able to transfer huge concentric forces into the rest of airframe.

Permanent improvements of such configurations based on the same flight logic that are associated with high lift coefficient including limited wing area and chords resulted over time with increasingly diminishing returns and finally virtually with the total blockage in terms of ability to further increase lift coefficient and/or lifting area for further lift production increase including further substantial decrease of total drag, as well as further substantial reduction of aircraft weight as shown in Table T-1 for two mid-size, mid-range aircraft including additional two large-size aircraft with longer range by two largest aviation companies, i.e., Airbus and Boeing.

The continuous improvement of aircraft that are based on the flight logic involving the application of efficient supercritical airfoils that have high lift-to-drag coefficient ratio has encountered serious obstacles at this point in terms of further substantial improvement of flight efficiency with further lift coefficient increase as it is increasing induced drag generation on the quadratic scale, whereas further increase of wing area is not possible due to the unfavorable features of such efficient airfoils that are jeopardizing flight safety.

Figure 1:
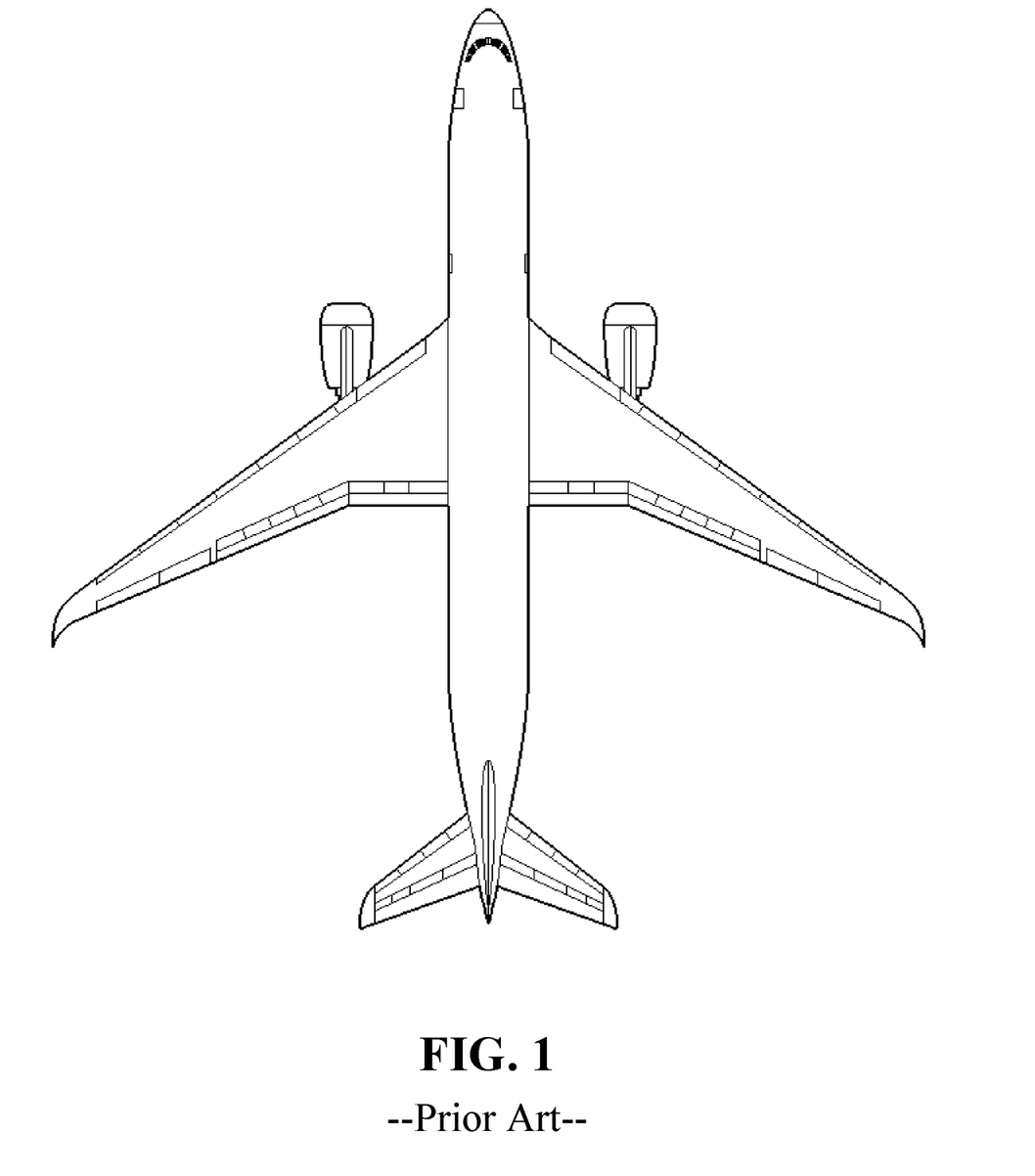
FIG. 1 shows the top view of the existing long range A350-900 aircraft with its wings representing a typical prior-art wings made of two large sections including a shorter-span inner section and a longer-span outer section that has a short wing extension.

FIG. 1 shows a typical shape and size of wings of the existing modern aircraft like long-range A350-900 airplane, which has three sections including inner and outer section, as well as a small tip extension. Table T-1 shows comparative data for wing geometry, weights, and basic flight performance parameters of four aircraft including two long-range aircraft like A350-900 and B787-9 aircraft, as well as two mid-size, mid-range aircraft including A321 and B737-MAX10 by two leading world's aviation companies Airbus and Boeing. Data that are related to gross wing area, span, aspect ratio that includes tip extension, all weights, as well as speed and range were sourced from Wikipedia and the web sites of the aforementioned aviation companies, whereas all other geometry related data were precisely measured from at-scale images that were published by these two companies.

By using the above referenced data, we calculated derived performance characteristics including max. specific loading with zero-fuel aircraft weight and specific fuel consumption (SFC) for comparative analysis. Zero fuel weight was calculated by adding Operating Empty Weight and Max. Payload Weight. Max. wing specific loading was calculated as the ratio between Max. T/O weight and effective wing area, whereas zero fuel weight specific loading was calculated as the ratio between zero fuel aircraft weight and effective wing area. Specific fuel consumption was calculated by dividing Max. Fuel Weight by Max. Payload Weight and Max. Range.

TABLE T-1

| # | Aircraft | B787-9 | A350-900 | A321 | B737MAX10 |
|---|---|---|---|---|---|
| 1 | Span with Tip Extension [m] | 60.12 | 64.75 | 35.8 | 35.92 |
| 2 | Span without Tip Extension [m] | 54 | 58.46 | 34 | 33.15 |
| 3 | Length of Regular Tip Chord [m] | ~2.45 | ~2.3 | ~1.8 | ~1.6 |
| 4 | Length of Root Chord | ~12.1 | ~13.43 | ~6.28 | ~6.4 |
| 5 | Outer Section Taper Angle T.A. [°] | 11 | 13 | 9.7 | 12.6 |
| 6 | Taper Ratio of Outer Section | 0.333 | 0.275 | 0.447 | 0.366 |
| 7 | Outer Section Span [m] | 16.56 | 18.96 | 10.54 | 11.49 |
| 8 | Inner Section Taper Angle T.A. [°] | 34 | 34 | 28 | 28 |
| 9 | Taper Ratio of Inner Section | 0.59 | 0.588 | 0.60 | 0.66 |
| 10 | Inner Section Span [m] | 7.56 | 7.3 | 4.6 | 3.2 |
| 11 | Outer vs. Inner Section Span Ratio | 2.19 | 2.6 | 2.3 | 3.6 |
| 12 | Wing Outer Section Effective Area [m$^2$] | 171.11 | 199.94 | 61.25 | 68.6 |
| 13 | Wing Inner Section Effective Area [m$^2$] | 153.89 | 160.06 | 45.26 | 34.7 |
| 14 | Outer vs. Inner Section Area Ratio | 1.112 | 1.249 | 1.353 | 1.977 |
| 15 | Total Wing Effective Area [m$^2$] | 325 | 360 | 106.51 | 103.3 |
| 16 | Total Wing Gross Area [m$^2$] | 377 | 442 | 128 | 127 |
| 17 | A.R. | 9.59 | 9.49 | 10 | 10.16 |
| 18 | Aspect Ratio Without Extension [m] | 7.735 | 7.732 | 9.03 | 8.65 |
| 19 | Leading Edge Sweepback Angle [°] | 34 | 34.4 out/ 37 inside | 28 | 28 out/ curved L.E. |
| 20 | Max. T/O Weight (MTOW) [kg] | 254,011 | 280,000 | 93,500 | 89,765 |
| 21 | Max. Payload Weight [kg] | 52,587 | 56,400 | 25,300 | 20,882 |
| 22 | Max. Fuel Weight [kg] | 101,456 | 110,523 | 24,104 | 20,730 |
| 23 | Operating Empty Weight (OEW) [kg] | 128,850 | 145,100 | 48,500 | 45,070 |
| 24 | Zero Fuel Weight [kg] | 181,437 | 201,500 | 73,800 | 65,952 |
| 25 | Max. Wing Loading [kg/m$^2$] | 781.57 | 777.8 | 877.85 | 869 |
| 26 | Wing Load w/Zero Fuel Weight [kg/m$^2$] | 558.27 | 559.7 | 690.9 | 638.5 |
| 27 | Max. Cruise Speed [Mach] | 0.85 | 0.85 | 0.78 | 0.79 |
| 28 | Max. Range [km] | 14,100 | 15,000 | 5,926 | 6,110 |
| 29 | SFC [kg/km pax] | 0.00013644 | 0.00013064 | 0.0001608 | 0.0001625 |

Source:
Measurements (Items #1-11);
Wikipedia, Airbus, Boeing, and calculations (Items #12-21);

Based on the above calculations, it is evident that the higher wing area, the lower SFC. Based on that, one may pose a question as to why aircraft engineers did not pursue a much higher increase of wing area. The initial answer seems simple and logical, which is that the aircraft wings of the existing aircraft, especially when flying at higher speeds generate on their surface a substantially high aerodynamic drag, whereby the large surface would generate a proportionally increased total aircraft drag. This is especially pronounced at high speeds across a wide leading edge. For this reason, there is even a wing minimization theory discussed in some engineering circles that relates to minimizing wing area while maximizing lift-to-drag coefficient ratio of airfoils. Wing area minimization may make sense for supersonic transport though.

Therefore, subsonic transport aircraft design is characterized with limited wing areas and maximized lift-to-drag coefficient ratio of airfoils, especially since the existing efficient supercritical airfoils with high lift-to-drag coefficients do not have a sufficient aft-shift of center of pressure with the change of attack angle, thus jeopardizing flight safety and further destabilizing aircraft. This lack of sufficient stabilization is even more pronounced if the wing area increase was done with chord elongations.

If attempting to increase the wing area with wing span increase, there are limits on wing span increases due to structural weight increase and reasons related to airport operations, thus resulting with wing area increase limitations in this regard as well. For this reason, most of the attempts that were done to maximize wing area were made by moderately increasing wing span, which also increased aspect ratio and minimized induced drag. Any attempts related to increasing wing area were done with a combination of a rather moderate increase of wing chords, tailplane, and wing span like with A350-900 aircraft relative to B787-9 aircraft where the wing area was increased by about 11 with limited span increase of 8%, and root chord increase of up to 15% along with the increase of the tailplane by around 6% and its distance increase from gravity center by about 10% to compensate for additional destabilization that was introduced with the above wing area increase.

The planform of all wings for these four aircraft are similar and made of three distinct sections including inner, outer, and tip section. The tip sections of mid-range aircraft are reflected with split winglets. The tip sections of long-range aircraft are smooth extensions in order to avoid interference drag with winglets at higher speeds. B787 aircraft has the longest wing extension, which is increasing the total wing span by 11.3%, whereas according to simplified calculations, it can reduce induced drag coefficient by about 20% relative to the base configuration. However, relatively small tip sections that do not generate aerodynamic lift have a marginal influence in terms of overall aircraft flight efficiency.

As previously noted, the wings with higher area have better aerodynamic efficiency as measured by SFC. The reason is that those configurations that have lower wing area have to compensate for the lack of lift by increased lift coefficient, which has a corrosive effect on induced drag on quadratic scale where wing tip mitigation is not enough to counter such increases.

The outer wing section of modern present-day aircraft have the largest wing area and span as shown in Table T-1 (lines 10 and 13), thus generating most of the lift, whereas providing for increased span for aspect ratio increase, which generates some contradictions and limitations. Namely, such large outer section that is set farther apart from the wing root is generating substantial structural loading with bending momentums, which is increasing the weight of wings.

The prior art solutions where there was attempt to increase wing area by substantial chord increases included "Blended Wing Body (BWB)" and other similar Flying Wing shapes like US20140197280, US20030197097, US20230092281, and CN102530236 to list some of such solutions. However, such configurations suffer from very poor aspect ratio due to extremely long root chords of the central section that are required for payload disposition within the wing contour and ensuing extremely high wing area with inability to recover aspect ratio with outer wing sections, whereas it is not possible to have airfoils with ultra-low thickness-to-chord ratio as the central section is used to store bulky payload, thus requiring sizeable thickness-to-chord ratio of such airfoils.

Figure 2A:
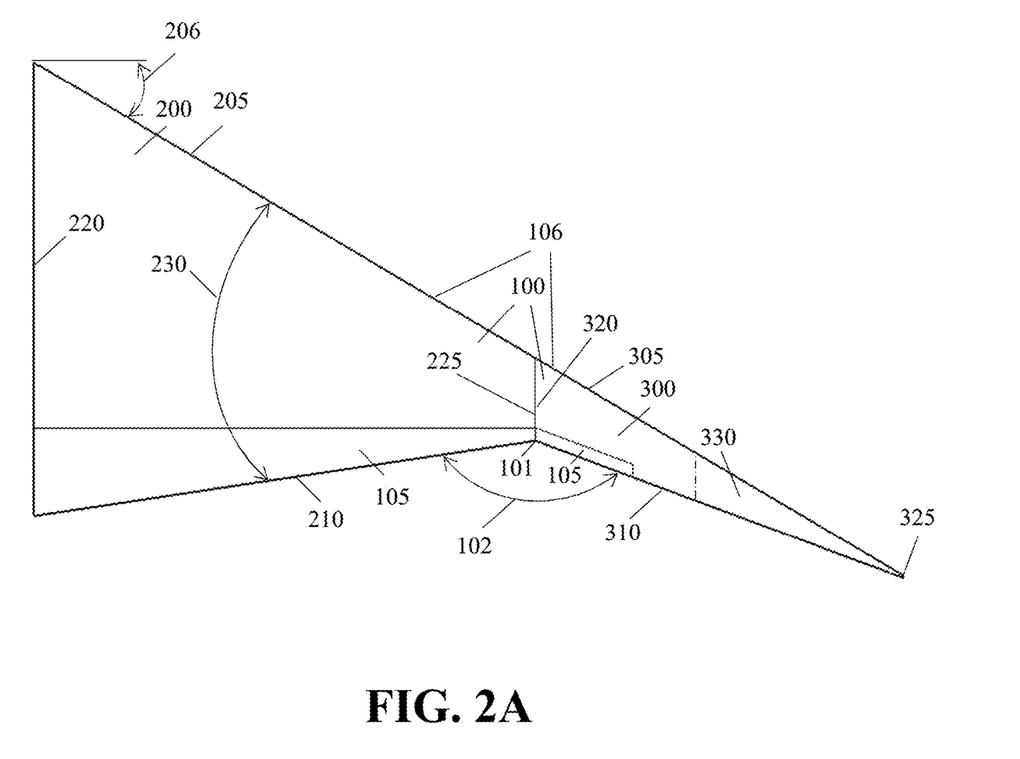
FIG. 2A shows a basic planform shape of a novel aircraft wing with tiplet configuration made of two distinct sections including a large and robust longer-span inner section with a high taper angle and elongated chords towards its root to maximize the increase of wing area, as well as a wide extended and slender outer "tiplet" section with a much lower taper angle and shorter chords to minimize the wing area for the maximization of aspect ratio, which is joined the inner section so that the root chord of tiplet section is the same as the tip chord of inner section.

One attempt to address the above shortcomings of Flying Wing type of aircraft was shown in U.S. Pat. No. 10,640,212 called "Double Wing Aircraft" where there is a proposed solution to have two-wing configuration with fuselage as shown in FIG. 2A with long chords and forward center of pressure to maximize the engagement of rear wing in lift production in cruise. However, that solution has a very poor aspect ratio, thus resulting with a high level of induced drag due to substantially increased wing areas. There was an attempt to recover aspect ratio on a Flying Wing solution as shown in FIG. 5A, but with minimal aspect ratio recovery results for induced drag reduction as it has a very large wing area for payload accommodation.

BRIEF SUMMARY OF THE INVENTION

A preferred embodiment of the present invention is "Aircraft Wing with Tiplet" for transport aircraft with the goals to provide for a substantial reduction of wing induced and profile drag, as well as substantial reduction of wing structural loading including simultaneous increase of wing structural resistance to reduce its weight with the specific wing shape, as well as substantial increase of total aerodynamic lift with a substantial increase of wing area for flights at significantly higher altitudes with substantially lower air density for reduction of total drag of all aircraft sections, thus resulting with substantially minimized energy consumption when compared to the prior art.

For that reason, "Aircraft Wing with Tiplet" is made of two very distinct wing sections including inner and outer section called "tiplet". The large and robust inner section has a trapezoidal shape with a high taper angle of up to 60° with long chords to reduce bending momentums and increase structural bending resistance for weight reduction with minimized thickness-to-chord ratio and substantial span that is close to the overall wing span of present-day aircraft with similar payload capacity to increase the total wing area and lift for altitude increase and total drag reduction. The lower thickness-to-chord ratio is additionally reducing wing compression and wave drag at higher speeds. Unfortunately, the robust inner section with substantially increased and limited span that is close to the overall span of the present-day aircraft for the same payload capacity is resulting with much lower aspect ratio due to much larger area compared to prior art that is increasing wing induced drag when compared to the wings of present-day aircraft.

For that reason, an outer "tiplet" section is joined to the tip chord of the inner section with shared leading edge but having very different and distinct shapes. The tiplet taper angle is reduced down to 7° for the increase of overall wing span with minimized wing area increase for aspect ratio increase and induced drag reduction along with minimization of wing loads coming from outer tiplet section considering its increasing distance from the wing root. The tiplet section span is limited from 30% to 80% of the inner section span. Sweepback leading edge angle of both sections has to be under 45° to minimize the appearance of leading edge vortices.

The "Aircraft Wing with Tiplet" can be adjusted for all-size, range, and speed of subsonic transport aircraft. For large, long-range, high-subsonic, and transonic aircraft, where wing profile, compression, and wave drag types dominate over induced drag, the taper angles of both sections need to be closer to their upper limits, whereas tiplet section span is closer to the lower limit of 30% of inner section span. For smaller and shorter-range aircraft that are flying with subsonic speeds of up to Mach 0.70 to Mach 0.78 where induced drag is dominant, the taper angles of both sections need to be shifted towards the lower limit (30° for inner section and 7° for tiplet section), whereas the tiplet section span must be closer towards the max. limit of 80% relative to the inner section span.

"Aircraft Wing with Tiplet" provides for the following applications and advantages over the prior art:
 a) An opportunity to design large long-range transport aircraft capable to fly at substantially higher cruise altitudes for reduction of all types of drag and fuel consumption at higher flight speeds for flight time reduction.
 b) An opportunity to design large aircraft to operate at urban airports closer to city centers with limited runway lengths.
 c) An opportunity to design mid-size aircraft with capacity around 200 passengers capable to operate on intercontinental point-to-point routes without using hubs.

Accordingly, besides the objects and advantages of the prior art as described above in this patent application, the following objectives and advantages of "Aircraft Wing with Tiplet" embodiments are:

a) Ability to build smaller regional aircraft that fly at lower speeds and altitudes with a single wing with tiplet and a tailplane with tiplet that except for pitch control is also producing a positive lift in cruise for the increase of total aircraft lift.

b) Ability to build smaller aircraft under 180 passengers with the same-size twin wings for flights of up to 5 hours with flight speeds of up to Mach 0.82 by additionally reducing the manufacturing cost on the account of having two identical wings.

c) Ability to build the single-aisle fuselage version of double-wing aircraft for mid and long-range intercontinental flights as the most rational solution to be used for both mid and long-range aircraft with long-range aircraft allowing for double-deck fuselage configuration.

Further objects and advantages of this invention will become apparent from the consideration of ensuing description and drawings. Although description contains many specifics, these should not be construed as limiting the scope of the invention but as merely providing the illustrations of some of the presently preferred embodiments of the invention, thus the scope of the invention should be determined by the appended claims and their legal equivalents rather than by given examples.

REFERENCE NUMERALS IN DRAWINGS

100 Aircraft Wing with Tiplet
101 Intersect Point
102 Intersect Angle
103 Trailing Edge Curved Line
104 Trailing Edge of Aircraft Wing with Tiplet
105 Pivotal Trailing Edge Flight Control Surfaces
106 Aircraft Wing with Tiplet Straight Leading Edge
107 Aircraft Wing with Tiplet Straight Trailing Edge
110 Front Wing
120 Rear Wing
130 Tailplane
200 Inner Section
205 Inner Section Straight Leading Edge
206 Leading Edge Sweepback Angle
210 Inner Section Straight Trailing Edge
212 Inner Section Trailing Edge Cutout Point
220 Inner Section Root Chord
225 Inner Section Tip Chord
230 Inner Section Taper Angle
235 Inner Section Chord Plane
300 Tiplet Section
305 Tiplet Section Straight Leading Edge
310 Tiplet Section Straight Trailing Edge
312 Tiplet Section Trailing Edge Cutout Point
320 Tiplet Section Root Chord
325 Tiplet Section Tip Chord
330 Tiplet Section Taper Angle
335 Tiplet Section Chord Plane
340 Tiplet Section Chord Plane Curved Portion
400 Transition Section of Aircraft Wing with Tiplet
410 Transition Section Trailing Edge Straight Line 420 Transition Section Root Chord
425 Transition Section Tip Chord
430 Transition Section Taper Angle

DETAILED DESCRIPTION OF INVENTION

The present patent application "Aircraft Wing with Tiplet" is anticipated to be applied mainly to aircraft for mass transportation with the aim to substantially reduce the energy consumption of such aircraft. The drive behind this idea was related to the possibilities for further substantial increase of total aerodynamic lift but in a novel manner with an unexpected chain of positive effects relative to existing aircraft wings by increasing the payload capacity and flying at higher altitudes where the air density lower, thus reducing the aerodynamic drag of all aircraft sections and therefore lowering energy consumption.

FIG. 1 shows a typical prior art wing of the existing transport aircraft A350-900 that was analyzed in the Background section.

FIG. 2A shows a basic configuration of aircraft wing with tiplet 100 planform that is comprised of the planforms of inner section 200 and tiplet section 300. The lift area of inner section 200 that lies in inner section chord plane 235 is bound by inner section straight leading edge 205 with leading edge sweepback angle 206, inner section straight trailing edge 210, inner section root chord 220, and inner section tip chord 225. Inner section chord plane 235 is defined by inner section straight leading edge 205 and inner section straight trailing edge 210. The inner section taper angle 230 between inner section straight leading edge 205 and inner section straight trailing edge 210 is between 30° and 60°. The inner section taper ratio is defined by the ratio between the length of inner section tip chord 225 and inner section root chord 220, which is less than 0.25. The span of inner section 200 that is defined as the distance between inner section root chord 220 and inner section tip chord 225 in transversal direction need to be at least 70% of the total span of prior art aircraft like in example shown in FIG. 7 for the same given payload in order to maximize the increase of the lifting area of inner section 200.

The tiplet section 300 as shown in FIG. 2A is defined by tiplet section straight leading edge 305, tiplet section straight trailing edge 310, tiplet section root chord 320, tiplet section tip chord 325. The lift area of tiplet section 300 lies in tiplet section chord plane 335 that is determined by the tiplet section straight leading edge 305 and tiplet section straight trailing edge 310. The lift area of tiplet section 300 is under 12% in size of the area of inner section 200. Tiplet section straight leading edge 305 is a smooth tangential extension of inner section straight leading edge 205, thus forming aircraft wing with tiplet straight leading edge 106 across the span of inner section 200 and tiplet section 300. Tiplet section straight trailing edge 310 is connected to inner section straight trailing edge 210 at intersect point 101 at intersect angle 102 that is between 120° and 180°. Tiplet section root chord 320 is joined to the inner section tip chord 225 so that it has the same position and length as inner section tip chord 225. The airfoils of inner section tip chord 225 and tiplet section root chord 320 are identical in order to have a smooth transition between inner section 200 and tiplet section 300. Tiplet section span is extending from tiplet section root chord 320 to tiplet section tip chord 325, which is between 30% and 80% of the span of inner section 200. Tiplet section taper ratio between tiplet section tip chord 325 and tiplet section root chord 320 is under 0.1. Tiplet section taper angle 330 between tiplet section straight leading edge 305 and tiplet section straight trailing edge 310 is between 7° and 35°. The task of tiplet section 300 is to maximize span extension with minimized area for aspect ratio increase and induced drag reduction, as well as lower wing aerodynamic and inertia loading across the wing span.

The inner section 200 and tiplet section 300 of aircraft wing with tiplet 100 of this patent application are defined with different airfoils where the forward center of pressure in cruise is in front of 30% of chord lengths compared to present day aircraft that have supercritical airfoils with the center of pressure aft of 40% of the chord length. These new airfoils with the forward center of pressure have a natural tendency to substantially shift the center of pressure in aft direction in stationary flight in cruise with the change of attack angle when induced by external disturbances in pitch direction. If the center of gravity is in front of center of pressure in the stationary flight regime in cruise, the aft shift of center of pressure of such airfoils with the change of attack angle is increasing the stabilizing effect of such wing in terms of aircraft natural dynamic pitch stability, whereas if the center of gravity is aft of wing's center of pressure in stationary flight regime in cruise, which defines an unstable wing configuration, the aft shift of center of pressure with the change of attack angles is shifting wing's lifting forces towards gravity center, thus substantially decreasing the destabilizing effect of such wing. Such substantial naturally stabilizing effect of aircraft with the change of attack angle when applied to double wing aircraft that must have gravity center deep between aerodynamic centers of two wings is increasing both natural pitch stability and commanded pitch efficiency with the increase of chord lengths and wing area.

The general effectiveness of airfoils and other wings' geometric variables for controllable flight of aircraft are changing with the change of flight speed and by extension changing the effectiveness of aircraft wing with tiplet 100. At higher speeds, the span of tiplet section 300 has to be closer to the lower limit of 30% of the span of inner section 200, whereas it is closer to 80% at lower speeds since induced drag is dominant at lower speeds, thus requiring wider tiplet section 300 to increase aspect ratio in order to reduce induced drag. Also, at higher speeds, inner section taper angle 230 and tiplet section taper angle 330 have to be higher and closer to their respective upper limits of 60° and 35° in order to increase chords across the span to reduce thickness-to-chord ratio, thus reducing compression and wave drag that dominate at high speeds, whereas at lower speeds, they need to be closer to their respective lower limits of 30° and 7° in order to increase aspect ratio and reduce induced drag, which is dominant at low speeds. The increased span of tiplet section 300 can maintain the same or increase aspect ratio for the mitigation of induced drag despite the increase of total wing area that is reducing aspect ratio relative to present-day aircraft with a similar payload capacity.

The above two geometric variables of the wing shape i.e., inner section taper angle 230 and tiplet section taper angle 330 impact the size of inner section taper ratio between inner section tip chord 225 and inner section root chord 220, as well as tiplet section taper ratio of tiplet section tip chord 325 and tiplet section root chord 320, which are generally less than 0.25 and 0.1 respectively due to inner section 200 generally having longer chords comparatively to tiplet section 300. Inner section straight leading edge 205 and tiplet section straight leading edge 305 need to have the same leading edge sweepback angle 206 of less than 45° for all speeds in order to avoid the induction of leading edge vortices. Lower values are for lower speeds and vice-versa.

The airfoils of aircraft wing with tiplet 100 generally have the lower lift coefficient compared to present-day supercritical airfoils of modern commercial aircraft wings but substantially increased wing area with much longer chords, which allows for more effective use of airfoils with the forward center of pressure to increase aircraft stability. The rate of lift coefficient reduction needs to be substantially less than the rate of the increased wing area to provide for a significant increase of total lift and allow for the flight at much higher altitudes for the reduction of total drag of all aircraft sections. On the other hand, since lift coefficient has corrosive effect on induced drag on quadratic scale, it has an oversized effect on induced drag reduction. Furthermore, the combination of lift coefficient reduction, substantial reduction of thickens-to-chord ratio due to substantial chord elongations, as well as increase of Reynolds Number related to such substantial chord elongations, altogether have a significant impact on the reduction of profile drag coefficient, thus being able to overcompensate increased drag due to increased wing area, especially at high subsonic and transonic speeds. The thickness-to-chord ratio of cross section airfoils of both inner section 200 and tiplet section 300 is possible to be under 6% due to very long chords and drastically reduced wing loading when compared to prior art wings considering reduced lift coefficient and increased wing area. Such very low thickness-to-chord ratio is resulting with a drastic reduction of compression and wave drag at high subsonic speeds.

The area size of inner section 200 is the most important geometric variable that is affecting the aerodynamic efficiency of aircraft wing with tiplet 100. It depends on other three geometric variables including the span of inner section 200, inner section taper angle 230, and inner section taper ratio. Inner section span is extending from inner section root chord 220 to the inner section tip chord 225. The inner section span and inner section taper angle 230 are the most powerful variables that are creating limits for the size of lifting area. To determine the lifting area size except for span and taper angle, one more variable is required that is related to chord lengths, which may be either root or tip chord, or the ratio between tip and root chord length, i.e., taper ratio. Inner section taper angle 230 and span are fixed values to be used for the calculation of wing area, whereas taper ratio is a variable, which depends on the absolute value of inner section root chord 220 or inner section tip chord 225. The area of tiplet section 300 has to be generally less than 12% in size of the area of inner section 200 for all flight speeds for two reasons including minimization of wing loading of aircraft wing with tiplet 100 due to a long distance of tiplet section 300 from inner section root chord 220, thereby reducing bending momentums in the root of aircraft wing with tiplet 100, whereas lower area of tiplet section 300 is increasing aspect ratio of aircraft wing with tiplet 100, which is the main task of tiplet section 300 at all speeds.

The data provided in Table T-1 in the background section of this patent application show that the outer sections of existing wings dominate in terms of larger wing area over the inner section by having a wider span as shown in line 11 despite having shorter chords than inner section. On the contrary, the aircraft wing with tiplet 100 of this patent application has the opposite wing design logic and planform optimization by having a large and robust inner section 200 of wing console with drastically increased taper angle between 30° and 60° depending on the flight speed and extended span that is close to the overall span of both sections of wings of present-day aircraft for the same payload capacity.

Aircraft wing with tiplet 100 was formed by joining quite distinct inner section 200 and tiplet section 300 with the common leading edge but with a substantially different inner section taper angle 230 and tiplet section taper angle 330 so that their trailing edges i.e., inner section straight trailing edge 210 and tiplet section straight trailing edge 310 intersect each other in intersect point 101 at intersect angle 102 between inner section straight trailing edge 210 and tiplet section straight trailing edge 310. Intersect angle 102 should be between 120° and 180° as otherwise if intersect angle 120 was lower, it would generate significant trailing edge induced vortices and aerodynamic drag.

The trailing sections of both inner section 200 and tiplet section 300 have simple pivotal trailing edge flight control surfaces 105 for very efficient pitch and roll control, as well as extra lift production at low speeds, especially of inner section 200 due to large wing areas with long chords.

Multiple times larger wing area with the same aircraft weight is proportionally reducing the lift coefficient and wing loading, whereas high wing taper is shifting the mean aerodynamic chord towards inner section root chord 220, thus substantially reducing structural loading of the wing with bending momentums, whereas substantially elongated wing chords despite reduced thickness-to-chord ratio are substantially increasing the bending structural resistance which with reduced bending momentum due to lower loading allow for weight reduction of wing airframe components for wing's weight reduction despite larger wing area. Additionally, substantially elongated inner section root chord 220 allows for the full structural blending of wingbox and fuselage airframe including additional weight reduction of both wings and fuselage due to elimination of heavy metal alloys that are needed for the fuselage-wing joint when chords are shorter. Long wing chords of inner section 200 generate a high ground effect to provide for significant benefits at low speeds during takeoff and landing in terms of weight reduction of flight control surfaces like leading edge slats and trailing edge flaps, engines with pylons and nacelles, as well as landing gears with undercarriage.

Figure 2B:
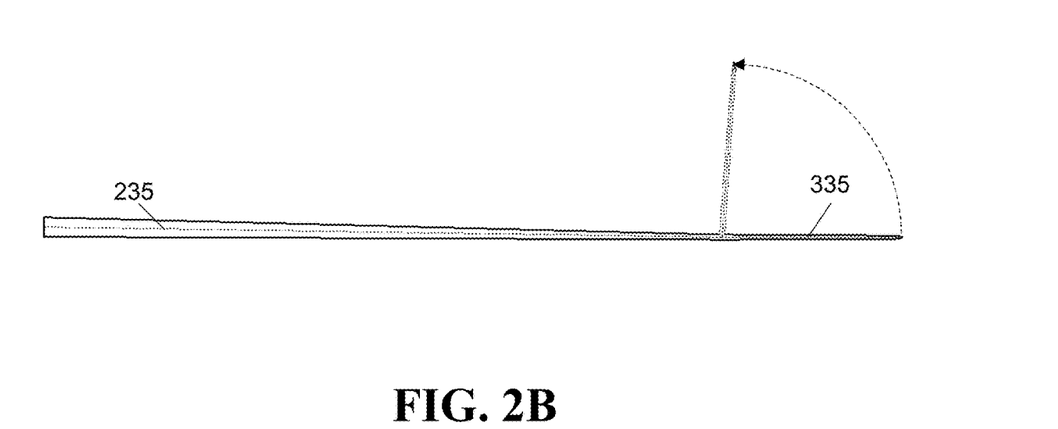
FIG. 2B shows a front view of the novel aircraft wing with tiplet configuration with the outer portion of the wide tiplet section being folded up to meet requirements associated with airport operations.

FIG. 2B shows the front view of the basic planform configuration of aircraft wing with tiplet 100. Tiplet section 300 lies in tiplet section chord plane 335, which is identical to inner section chord plane 235 where inner section 200 meets tiplet section 300 for a smooth aerodynamic transition between inner section 200 and tiplet section 300. At least one portion of the tiplet section 300 is variably folded up during takeoff, landing, and ground operations to reduce wing span.

Figure 3:
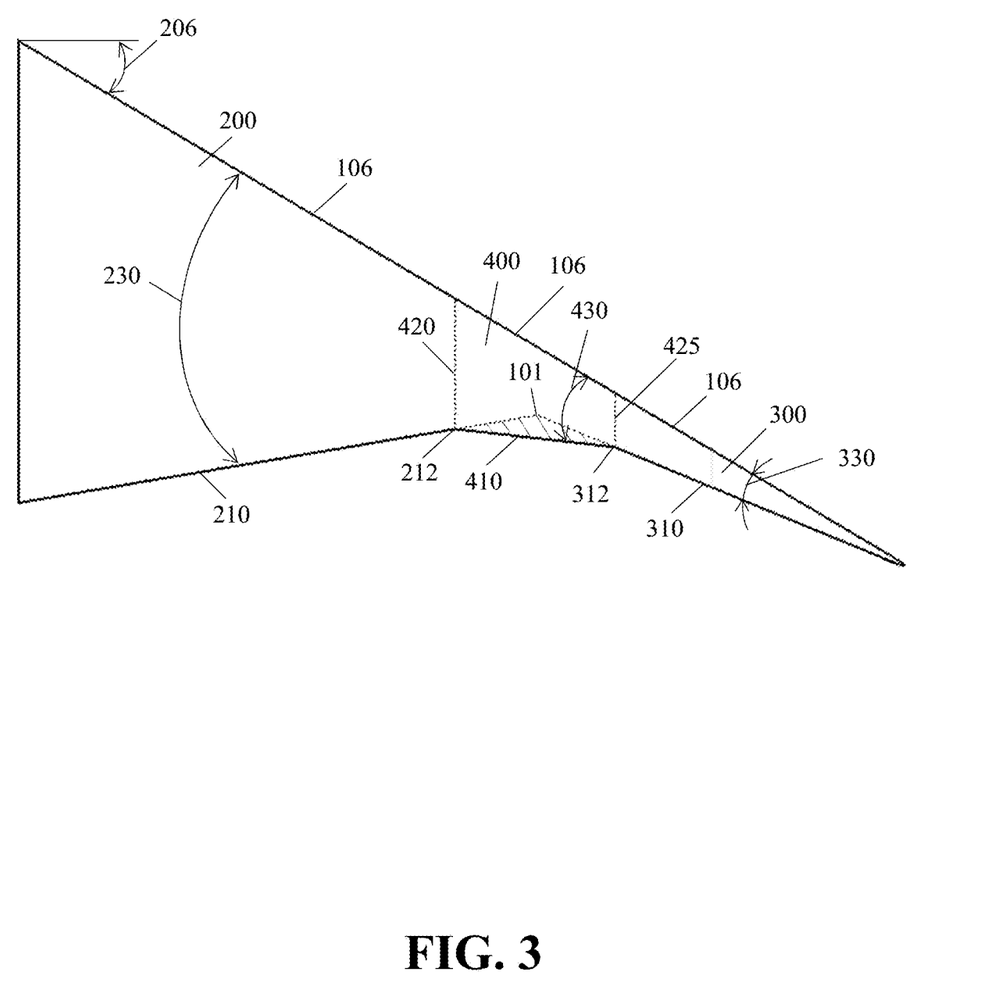
FIG. 3 shows a modified basic planform of aircraft wing with tiplet as shown in FIG. 2A where the trailing edge of inner and tiplet sections before their mutual intersection are cut out, whereby the original trailing edges of inner and tiplet sections were replaced by a straight trailing edge that is connecting the cutout points for reduction of interference drag between highly distinct inner section and tiplet section.

FIG. 3 shows a modified trailing edge solution where inner section straight trailing edge 210 and tiplet section straight trailing edge 310 are cut out before their mutual intersect point 101. Inner section straight trailing edge 210 is cut out at the inner section trailing edge cutout point 212, whereas tiplet section straight trailing edge 310 is cut out at tiplet section trailing edge cutout point 312. The cutout segments on both inner section straight trailing edge 210 from inner section trailing edge cutout point 212 to intersect point 101 and tiplet section straight trailing edge 310 from tiplet section trailing edge cutout point 312 to intersect point 101 are substituted with a new transition section trailing edge straight line 410 between inner section trailing edge cutout point 212 and tiplet section trailing edge cutout point 312. Transition section trailing edge straight line 410 together with transition section root chord 420 at inner section trailing edge cutout point 212, transition section tip chord 425 at tiplet section trailing edge cutout point 312, and aircraft wing with tiplet straight leading edge 106 between transition section root chord 420 and transition section tip chord 425 bound transition section of aircraft wing with tiplet 400 for reduction of trailing edge vortices between the distinct inner section 200 and tiplet section 300. The most effective reduction of trailing edge vortices and drag is achieved if the distance between intersect point 101 and inner section trailing edge cutout point 212, as well as the distance between intersect point 101 and tiplet section trailing edge cutout point 312 are the same.

Transition section trailing edge straight line 410 and aircraft wing with tiplet straight leading edge 106 are defining transition section taper angle 430, which is greater than tiplet section taper angle 330 and lower than inner section taper angle 230 for the optimal mitigation of aerodynamic interference between transition section of aircraft wing with tiplet 400 and inner section 200, as well as between transition section of aircraft wing with tiplet 400 and tiplet section 300.

In addition to eliminating a sharp intersect angle 102 between inner section straight trailing edge 210 and tiplet section straight trailing edge 310 as shown in FIG. 2, transition section trailing edge straight line 410 of transition section of aircraft wing with tiplet 400, as a side effect is increasing the area of aircraft wing with tiplet 100 relative to the same of the original version of aircraft wing with tiplet 100 in FIG. 2A, which is shown with the shaded area in FIG. 3 that is bound by the triangle of inner section trailing edge cutout point 212, intersect point 101, and tiplet section trailing edge cutout point 312. The added area is reducing the aspect ratio of aircraft wing with tiplet 100 due to chord elongation of transition section of aircraft wing with tiplet 400. Aircraft that fly at lower speeds below Mach 0.75 where induced drag is dominant should have a shorter distance between intersect point 101 and inner section trailing edge cutout point 212, as well as intersect point 101 and tiplet section trailing edge cutout point 312 to provide for a sufficient level of mitigation of aerodynamic interference drag between distinct inner section 200 and tiplet section 300, as well as minimized shaded area to increase aspect ratio in order to minimize induced drag. The opposite is true for higher subsonic and transonic flight speeds, whereby it is encouraged to increase the shaded area for the increase of chord lengths of transition section of aircraft wing with tiplet 400 for profile drag reduction.

Figure 4A:
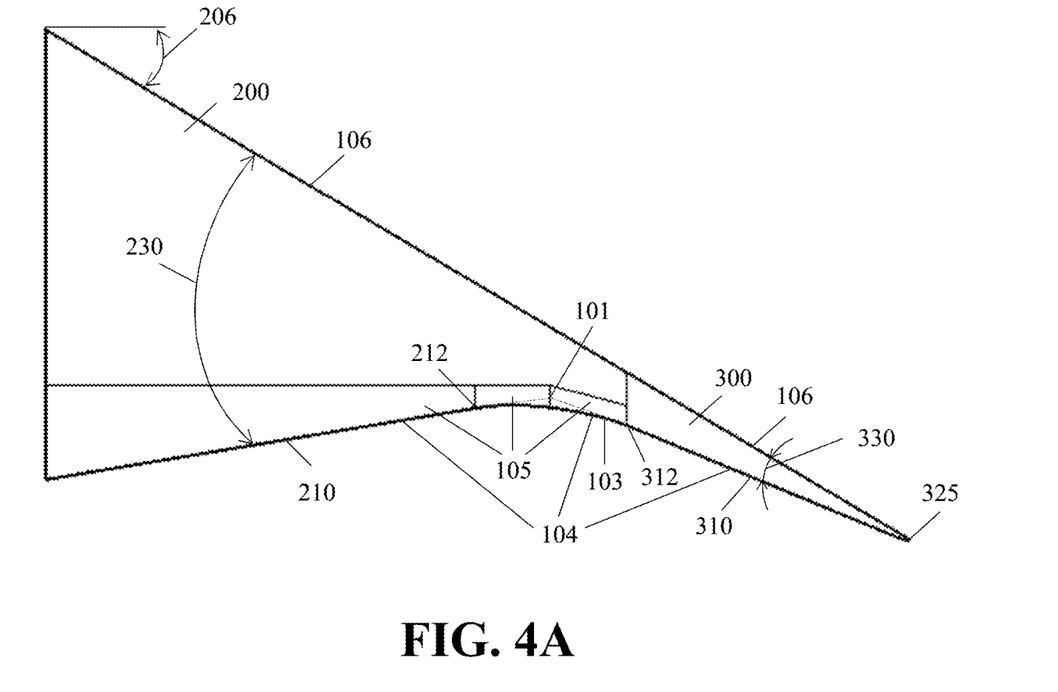
FIG. 4A shows an improved configuration as shown in FIG. 3 for additional reduction of interference drag between inner section and tiplet section, whereby the straight trailing edge connecting the cutout points was replaced with a smooth curved trailing edge that is tangentially joining inner section straight trailing edge and tiplet section straight trailing edge.

FIG. 4A shows an alternative solution for the reduction of interference drag between distinct inner section 200 and tiplet section 300 as shown in FIG. 2A so that inner section trailing edge cutout point 212 of inner section 200 and tiplet section trailing edge cutout point 312 of tiplet section 300 are connected with a smooth trailing edge curved line 103 that is tangentially joined to inner section straight trailing edge 210 in inner section trailing edge cutout point 212 and tiplet section straight trailing edge 310 in tiplet section trailing edge cutout point 312, thereby forming an integral and smooth trailing edge of aircraft wing with tiplet 104 without any breaks with the goal of eliminating or greatly minimizing the interference drag between distinct inner section 200 and tiplet section 300. The new trailing edge curved line 103 added less extra wing area to aircraft wing with tiplet 100 comparatively to the shaded area as shown in FIG. 3 with transition section trailing edge straight line 410.

FIG. 4A further shows simple pivotal trailing edge flight control surfaces 105 of aircraft wing with tiplet 100 that are universal and can be simultaneously used for pitch and roll control, as well as for extra lift production as flaps including yaw control as spoilers. Aircraft wing with tiplet 100 does not have any leading edge movable surfaces and devices.

Figure 4B:
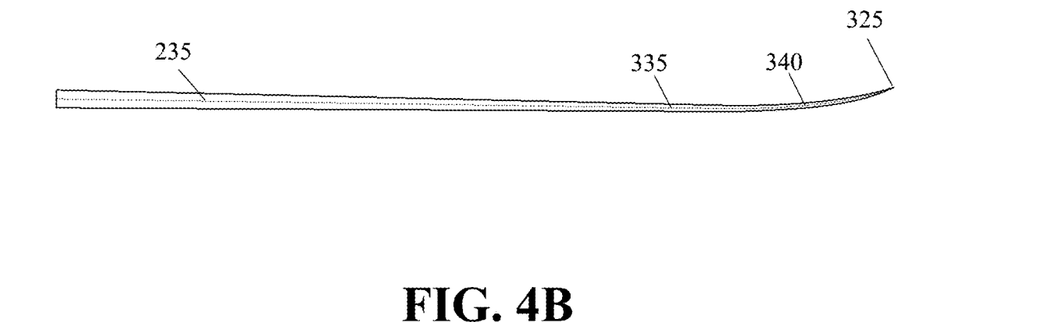
FIG. 4B shows a front view of the configuration shown in FIG. 4A where a thin slender tip portion of the tiplet section is smoothly and progressively curved up towards the tip of the tiplet section for the increase of shape rigidity and aerodynamic flutter avoidance.

FIG. 4B is showing tiplet section chord plane 335 that is tangentially joined inner section chord plane 235, whereby tiplet section chord plane 335 is progressively and gradually curving up towards tiplet section tip chord 325, thus forming tiplet section chord plane curved portion 340 in order to provide for additional structural resistance to potential aerodynamic flutter due to diminishing chord lengths of tiplet section 300 towards tiplet section tip chord 325. The vertical elevation of tiplet section tip chord 325 resulting from the upward direction of tiplet section chord plane curved portion 340 should be less than about 15% of tiplet section span from intersect point 101 to tiplet section tip chord 325. Such vertical elevation of tiplet 300 is minimized as it is used only to increase the rigidity of the slender portion of tiplet section 300 to avoid aerodynamic flutter.

Figure 5:
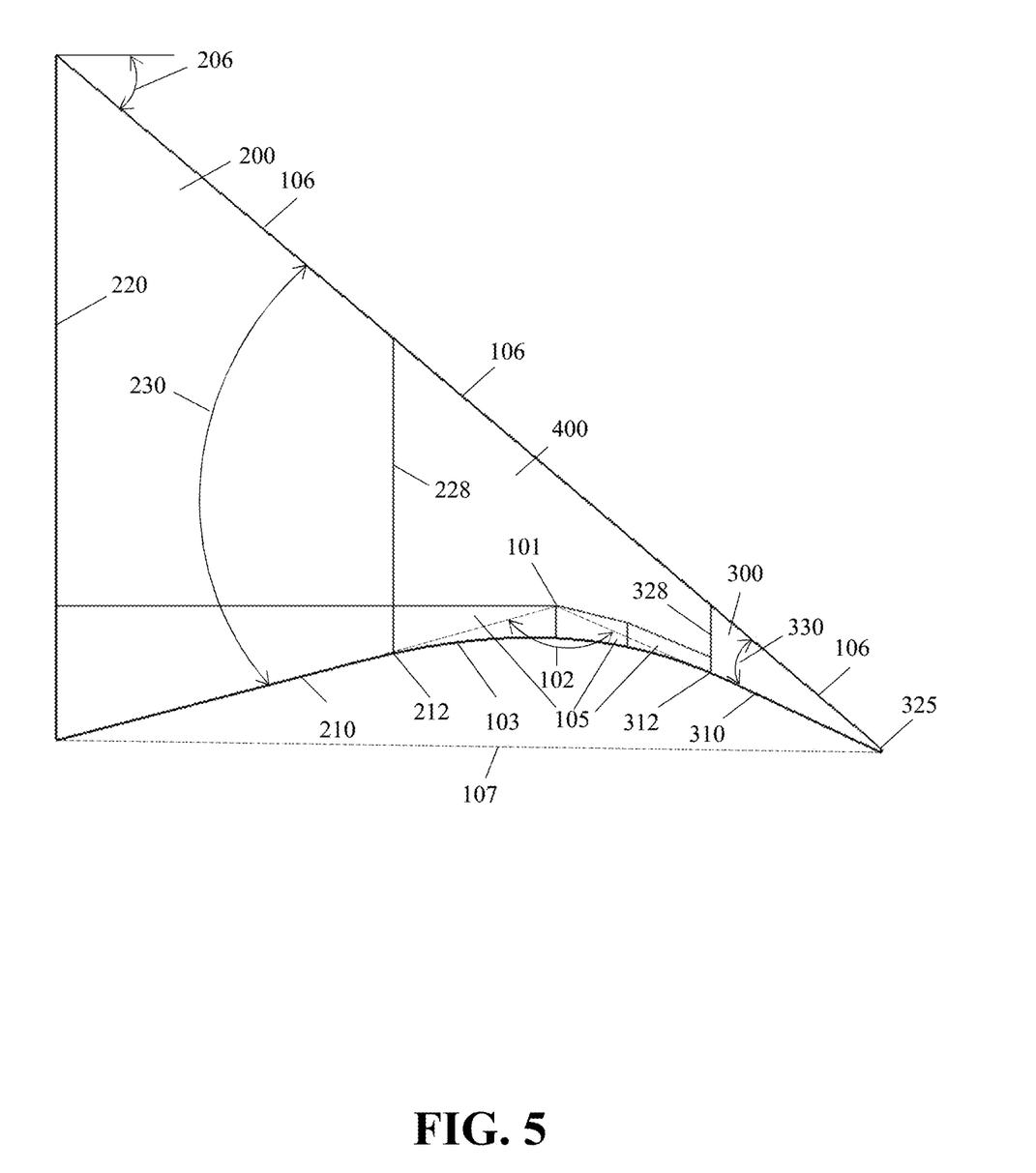
FIG. 5 shows the planform of aircraft wing with tiplet that is optimized for high subsonic and transonic speeds with substantially increased taper angles of both inner and tiplet section to maximize chord elongations towards the root of the sections in order to reduce thickness-to-chord ratio down to 4% and possibly beyond for the reduction of compression and wave drag and economical cruise speed increase.

FIG. 5 shows aircraft wing with tiplet 100 for high subsonic speeds of over Mach 0.85 towards transonic speeds of Mach 0.9 and beyond. It is characterized with a high inner section taper angle 230 of over 55° that is very close to recommended upper limit of about 60°, as well as tiplet section taper angle 330 of over 15° that is between the upper limit of about 35° and the recommended lower limit of about 7°.

The leading edge sweepback angle 206 is slightly over 40°, which is close to the recommended upper limit of about 45° due to high speeds. If there is a longer distance from inner section trailing edge cutout point 212 and tiplet section trailing edge cutout point 312 to intersect point 101, it results with a smoother transition and longer chords. Extremely elongated inner section root chord 220 of up to 85% of the span of aircraft wing with tiplet 100 as shown in FIG. 5 resulted with aspect ratio of only 5.4, or twice lower than the wing shown in FIG. 2A, which is designed for speeds of up to Mach 0.8. However, induced drag of aircraft at such speed is much lower compared to compression and wave drag.

There is a special edge case when intersect angle 102 is 180° at which point tiplet section taper angle 330 becomes the same as inner section taper angle 230, thus aircraft wing with tiplet 100 is getting transformed into a quasi-triangular wing, whereas inner section straight trailing edge 210 and tiplet section straight trailing edge 310 are transformed into a single aircraft wing with tiplet straight trailing edge 107. This is a special edge case that is used for high transonic speeds to further increase chords lengths, which allows for wing area increase with longer chords and thin airfoils across the span to further reduce compression and wave drag. The adverse effect is that the aspect ratio is reduced due to increased wing area, which is why it would be used for very high speeds where induced drag is minimized.

FIGS. 6A-6F show comparative drawings between different wing shapes, all of which are having the same area of 120 m² sized at scale for comparison purposes to roughly match the base wing area of 122 m² of A321 aircraft for the main purpose of showing how different wing shapes impact aspect ratio and induced drag, as well as profile drag with chord lengths, which further shows that aircraft wing with tiplet 100 configuration has better both aspect ratio and longer chords, thus offering an opportunity to provide for simultaneous and balanced reduction of induced and profile drag.

Figure 6A:
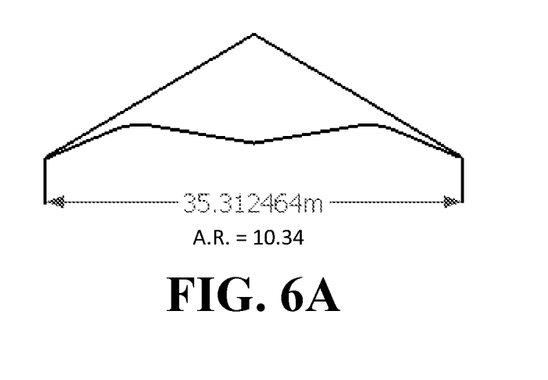
FIGS. 6A-6F show comparative planform shapes with the same area of 120 m 2 sized at scale of aircraft wing with tiplet in FIG. 6A relative to some other distinct prior art wings to show the superiority of aircraft wing with tiplet configuration for simultaneous induced and profile drag reduction by having both increased aspect ratio and thinner airfoils, whereas further providing for increased structural resistance.

FIG. 6A shows aircraft wing with tiplet 100 of this patent application.

Figure 6B:
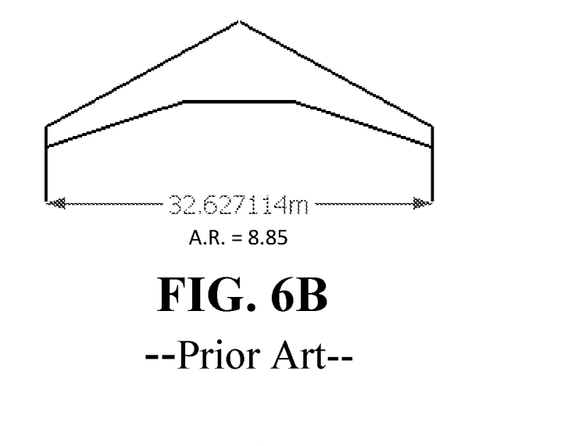

FIG. 6B shows the prior art wing of aircraft A321.

Figure 6C:
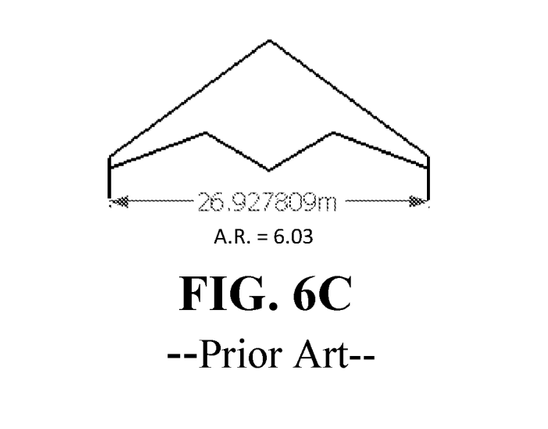

FIG. 6C shows the prior art wing of patent application CN102530236 called "Central Body of Tailless Blended Wing Body Aircraft".

Figure 6D:
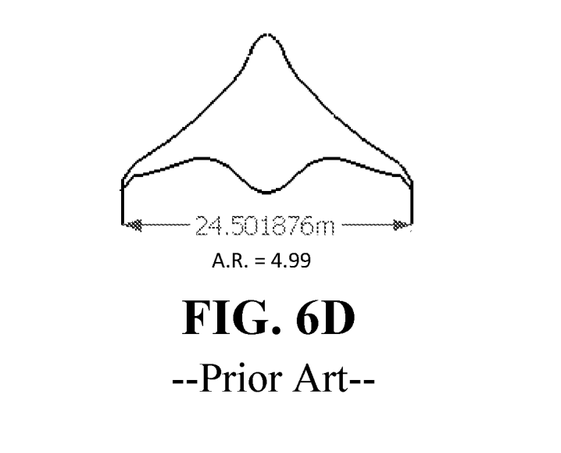

FIG. 6D shows the prior art wing of patent application US20030197097 called "Reconfiguration Control System for an Aircraft Wing".

Figure 6E:
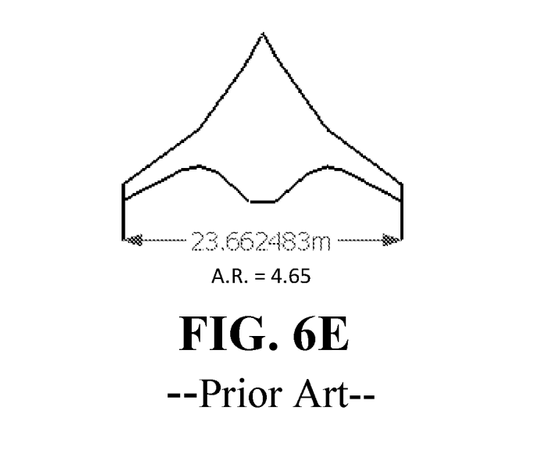

FIG. 6E shows the prior art wing of patent application US20050178912 called "Transformable Airplane".

Figure 6F:
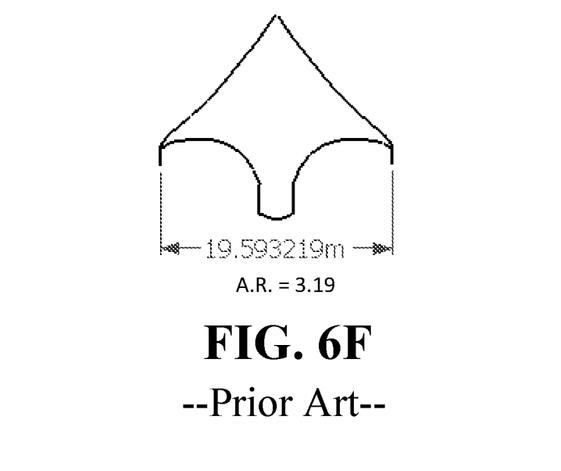

FIG. 6F shows the prior art front wing of U.S. Pat. No. 10,640,212B1 called "Double Wing Aircraft".

Wing shapes must meet contradictory requirements for both reduced induced and profile drag. Induced drag reduction requires shorter chords and wider span, while wing profile drag reduction requires longer chords for t/c reduction that increase wing area and therefore generally result with lower aspect ratio. The wings of present-day aircraft like A321 as shown in FIG. 6B have emphasis on increased aspect ratio and reduced induced drag since their wing chords are limited due to inability to have a sufficient level of natural pitch stability considering the position of gravity center relative to wing and tailplane centers of pressure as described in the background section of this patent application. On the other hand, some of the prior art solutions with blended wing and fuselage solutions have very poor aspect ratio as having the outsized central wing area, whereas they also cannot fully exploit the reduction of profile drag of the central section on the account of very long chords for t/c reduction due to payload disposition within the wing airframe, thus requiring thicker airfoils that result with increased profile drag.

Aircraft wing with tiplet 100 of this patent application as shown in FIG. 6A represents a compromise to have the best balance of simultaneous induced and profile drag reduction despite contradictory requirements for induced and profile drag reduction in terms of wing shapes. It is evident based on the comparative drawings with the same wing area at scale that the shape of aircraft wing with tiplet 100 has comparatively the widest span and better expected induced drag relative to the closest present-day wing configuration like A321 of about 17% since $[(b^2/S)_{6A}-(b^2/S)_{6B}]/(b^2/S)_{6B}]=0.17$ for the same wing area.

On the other hand, the wing shape of aircraft wing with tiplet 100 of this patent application as shown in FIG. 6A has much lower profile drag when compared to present-day aircraft as shown in FIG. 6B due to longer chords and subsequent lower thickness-to-chord ratio, as well as due to a much lower bending momentums from the tip to root chord due to very low tip area that is substantially reducing bending momentums towards the root and longer chords towards the wing root that are offering higher bending resistance and consequently allowing for lower t/c ratio, whereas also having not just a better induced drag but profile drag as well relative to other blended wing configurations since those wing configurations are carrying payload within their wing airframe, thus requiring thicker airfoils, which is not the case with aircraft wing with tiplet 100.

Figure 7:
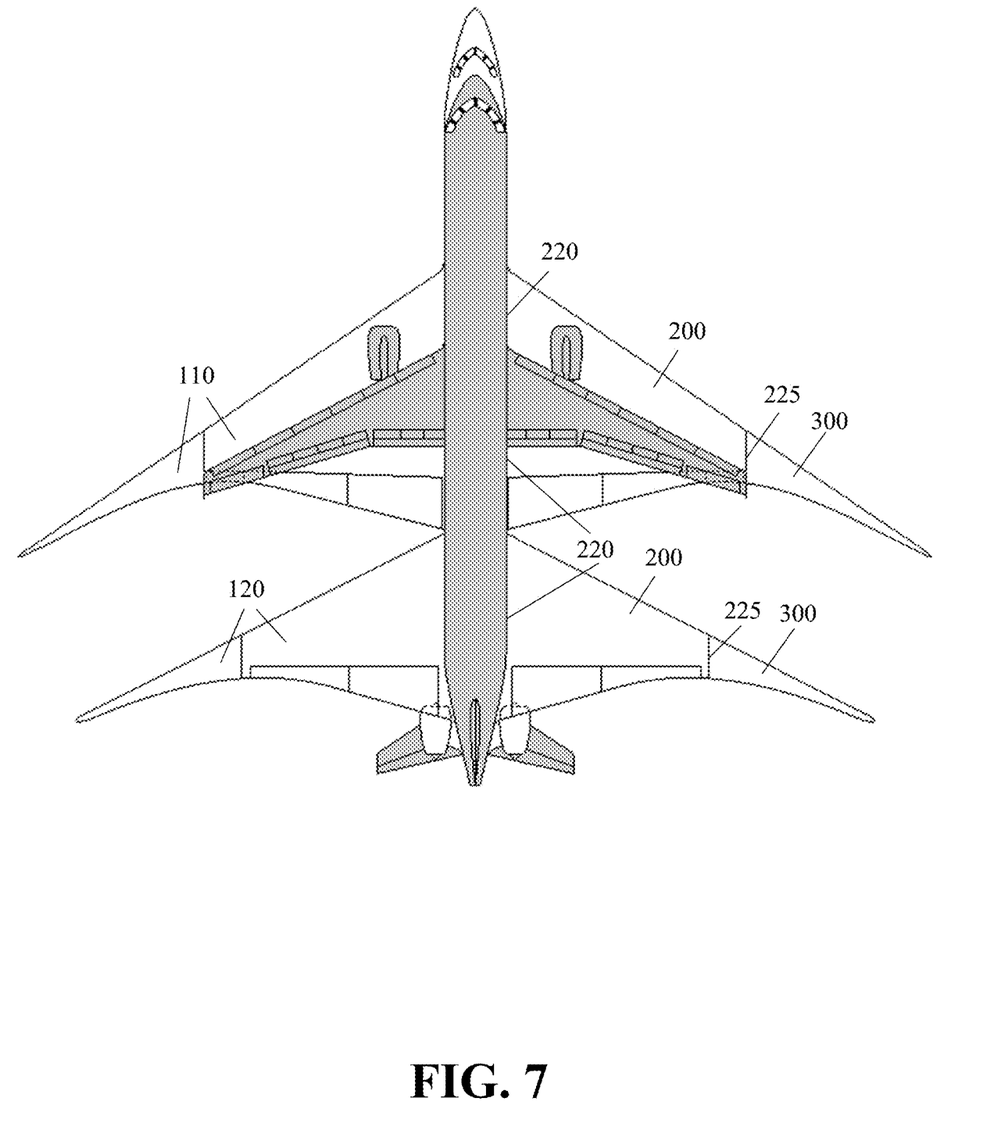
FIG. 7 shows a comparison between the prior art Airbus A321 aircraft and a tube-and-wing aircraft when aircraft wing with tiplet configuration was applied to it as a front and a rear wing in a double-wing aircraft configuration with a similar payload capacity as A321, which is henceforth referred to as Blended Double Wing (BDW) aircraft that has up to 5 times larger total lifting area for a drastic increase of total lift and reduction of total drag.

FIG. 7 shows comparative images between a typical prior art wing such as A321 and the wings of aircraft wing with tiplet 100 when such wings are applied to tube-and-wing aircraft configuration as front wing 110 and rear wing 120 of Blended Double Wing (BDW) aircraft.

The inner section span of front wing 110 is the same as the total wing span of A321 aircraft including its inner and outer sections, whereas the inner section span of rear wing 120 is about 85% of the total wing span of A321 aircraft including its inner and outer section. The total span of front wing 110 is wider by 69% relative to A321 aircraft, thus it would be required for the tiplet section 300 of front wing 110 to be folded up during airport operations as shown in FIG. 2B. The same would be required for rear wing 120 that is wider than A321 aircraft by 46%.

The total lifting area of front wing 110 is 3.15 times larger than the wing area of A321 aircraft, whereas the total lifting area of rear wing 120 is 1.93 times larger than the wing area of A321 aircraft. The total lifting area of BDW aircraft including both front wing 110 and rear wing 120 is 5.08 times larger than the lifting area of A321 aircraft. Aspect ratio of front wing 110 is 8.58, whereas the aspect ratio of rear wing 120 is 10.4, whereby resulting with the weighted aspect ratio of BDW aircraft of 9.28, which is virtually the same as the aspect ratio 9.289 of A321 aircraft without winglets.

The sweepback angle of leading edge of front wing 110 is at 34°, whereas the same for rear wing 120 is 27° compared to the leading edge sweepback angle of A321 wing of 28°. The inner section root chord 220 of front wing 110 is 2.7 times longer than the root chord of A321 wing, whereas inner section tip chord 225 of front wing 110 is 2.25 times longer than the tip chord of A321 wing. The inner section root chord 220 of rear wing 120 is 1.88 times longer than the root chord of A321 wing, whereas inner section tip chord 225 of rear wing 120 is 1.9 times longer than the tip chord of A321 wing.

The huge increase of the total lifting area of BDW aircraft of about 5 times allows for the reduction of lift cruise coefficient from roughly 0.5 to 0.2, thus resulting with $(0.5/0.2)^2=6.25$ times lower induced drag coefficient on this count only as there is a quadratic relationship between lift coefficient and induced drag coefficient though this advantage is subsequently partially reduced by about 5 times due to larger total lifting area. However, the differential between 2.5 times lower lift coefficient and about 5 times higher lifting area is resulting with twice larger total lifting force for the reduction of total drag including induced drag by 50% due to resulting lower air density.

Five times larger area of robust wings of such BDW aircraft that are opposing the same weight and inertia forces allow for the substantial reduction of both airframe weight of front wing 110 and rear wing 120, as well as the reduction of relative thickness of wings down to around 4% for both wings, which along with 2.5 times lower lift coefficient and longer chords is drastically reducing the wing compression and wave drag at high subsonic speeds, thus together with the substantial reduction of induced drag resulting with the reduction of specific fuel consumption of over 60% relative to aircraft with the prior art wings.

Detailed analyses showed that the opposite wing design logic would provide multiple times higher total lift by favoring inner section 200 to drastically increase wing area with substantial chord and span elongations including high taper angle instead of having outer section accounting for the largest wing area. The outer tiplet section 300 would have drastically reduced chords with mild taper and extended span to recover lost aspect ratio with inner section that has a high wing area with long chords and high taper ratio. Therefore, the role of inner section 200 would be primarily for the substantial increase of lift production and profile drag reduction at high speeds due to drastically longer chords and ensuing thickness-to-chord ratio reduction including increased structural resistance for wing weight reduction due to long chords as well as lower bending momentums due to high taper ratio, whereas the outer section would have minimized lift production to reduce wing loads but having extended span to recover aspect ratio that was lost with the inner section 200 that has high taper and large wing area. Such wing design would result with substantially increased wing area in multiples, whereas together with multiples of lift coefficient decrease that is less than the multiples of wing area increase is resulting with substantially increased flight altitude with significantly lower air density, thus substantially reducing the total drag of all aircraft sections, while together with significantly longer chords and resulting substantially lower thickness-to-chord ratio of inner section 200 resulting with a drastic reduction of SFC by over 60%.

Figure 8:
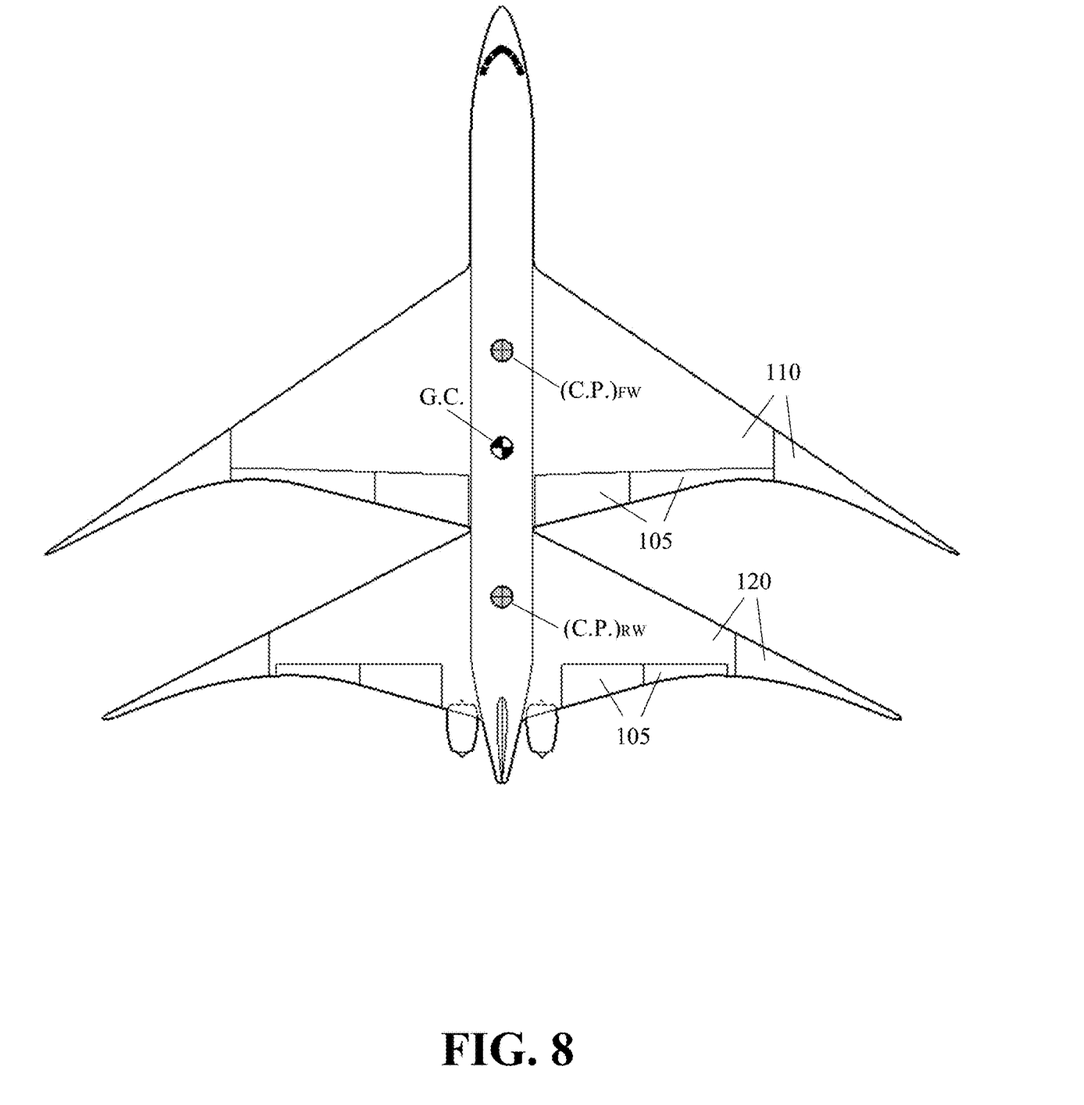
FIG. 8 shows a clean image of BDW aircraft from FIG. 7.

FIG. 8 shows a clean image of BDW aircraft from FIG. 7 that depicts a suggested favorable configuration of a long-range tube-and-wing aircraft under 250 passengers for point-to-point transportation routes, which is using aircraft wing with tiplet 100 in two-wing configuration. It further shows a suggested disposition of wings, as well as their size and shape that would maximize aerodynamic and structural efficiency.

Figure 9:
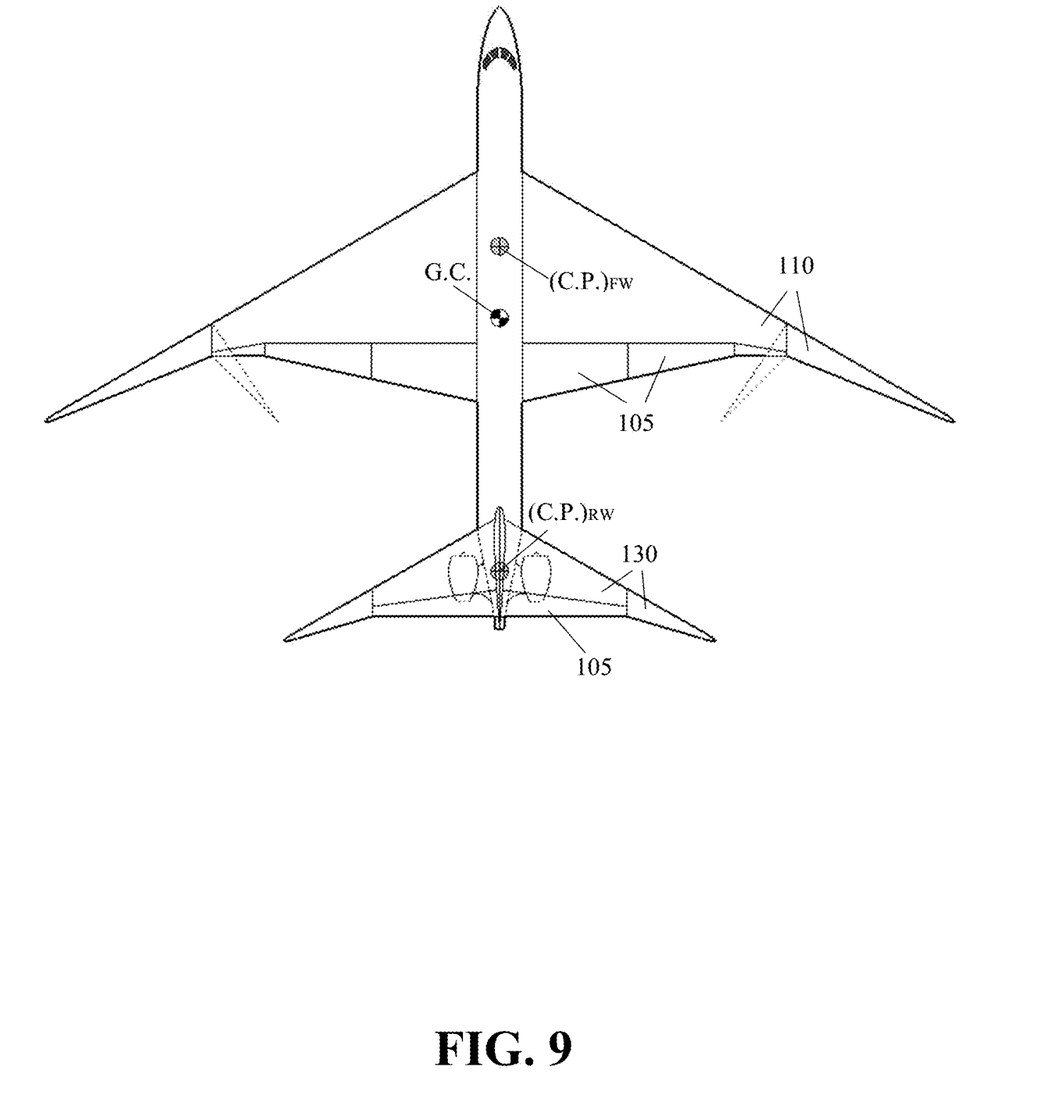
FIG. 9 shows a tube-and-wing aircraft to which aircraft wing with tiplet configuration has been applied as a wing and tailplane arrangement where both the wing and the tailplane have a similar aircraft wing with tiplet configurations.

FIG. 9 shows a tube-and-wing aircraft with a tailplane 130 that is different from the prior art in terms of wing and tailplane shapes that are corresponding to the aircraft wing with tiplet configuration of this patent application. Another difference is that both front wing 110 and tailplane 130 have airfoils with forward center of pressure as opposed to present-day aircraft that use supercritical airfoils on wings and symmetrical airfoils on tailplane. Such airfoils with the forward center of pressure have opposite flight mechanics related characteristics when compared to supercritical airfoils. They necessitate a different position of gravity center behind wing's aerodynamic center instead of in front of wing's aerodynamic center as it is the case with present-day aircraft. The main reason for such difference is related to pitch control efficiency and positive tailplane lift production in cruise.

If gravity center is set initially in front of wing's aerodynamic center as it is the case with supercritical airfoils to increase the initial natural level of pitch stability of a large front wing 110 with a positive static margin and tailplane 130 with the change of attack angle, it would result with undesirable outcome in terms of commanded pitch control of tailplane 130 as wing's aerodynamic center would shift substantially in aft direction and make aircraft too sluggish to have a good commanded pitch control. Therefore, the gravity center has to be initially set aft of aerodynamic center so that initially the destabilizing wing would support commanded pitch momentums by tailplane 130 in nose up direction, whereas in case of external disturbances in pitch direction, the fast moving center of pressure in aft direction towards gravity center would shift the aerodynamic center of front wing 110 aft of gravity center to decrease the destabilizing action of front wing 110, while the same airfoils when applied to tailplane 130 with the shift of aerodynamic center of tailplane 130 in aft direction would increase its stabilizing pitch momentum to push the aircraft back to the stable cruise position.

The shape and size of wing 110 and tailplane 130 including the distance between their aerodynamic centers from gravity center are adjusted so that both wing 110 and tailplane 130 are producing positive lift in cruise with the same lift coefficient. The shapes of wing 110 and tailplane 130 are adjusted so that both have a high aspect ratio over 10 (wing 10.06 and tailplane 10.69). Such aircraft is projected for passenger capacity between 120 and 150 passengers with the total effective lifting area of roughly 300 m$^2$, which is more than three times larger than the same of prior art aircraft with the similar passenger capacity like Fokker 100 aircraft that has the total effective wing area of under 100 m$^2$ and aspect ratio of 8.4 with passenger capacity between 107 and 122 passengers, as well as wing's thickness-to-chord ratio between 9.6% and 12.3% vs. 6% for the aircraft configuration that is shown in this image. Aircraft as shown in this figure would have to have foldable tiplets to allow for normal airport operations. The aircraft from FIG. 9 is much closer to double wing than single-wing configuration due to application of airfoils with forward center of pressure and different flight mechanics, thus providing for a longer range and much higher level of fuel efficiency when compared to prior-art aircraft.

We claim:
1. An aircraft wing with tiplet comprising:
   a. an inner section defined by:
      i. an inner section straight leading edge with a leading edge sweepback angle less than 45°;
      ii. an inner section straight trailing edge, wherein an inner section taper angle set between the inner section straight trailing edge and the inner section straight leading edge is between 30° and 60°;
      iii. an inner section root chord;
      iv. an inner section tip chord, wherein a taper ratio between the inner section tip chord and the inner section root chord is less than 0.25;
      v. an inner section chord plane determined by the inner section straight leading edge and the inner section straight trailing edge;
      vi. an inner section lift area bound by the inner section straight leading edge, the inner section straight trailing edge, the inner section root chord, and the inner section tip chord;
      vii. an inner section span extending from the inner section root chord to the inner section tip chord;
      viii. inner section cross sections in flight direction shaped as airfoils with thickness-to-chord ratio less than 6%, wherein the air pressure centers of the inner section cross sections are in front of 30% of the airfoils' chord lengths in cruise;
   b. a tiplet section joined to the outboard end of said inner section defined by:
      i. a tiplet section straight leading edge, wherein the tiplet section straight leading edge is a tangential extension of the inner section straight leading edge, thus forming an aircraft wing with tiplet straight leading edge;
      ii. a tiplet section straight trailing edge, wherein the tiplet section straight trailing edge is joined to the inner section straight trailing edge at an intersect point, an intersect angle between the inner section straight trailing edge and the tiplet section straight trailing edge at the intersect point is between 120° and 180°;
      iii. a tiplet section taper angle between the tiplet section straight leading edge and the tiplet section straight trailing edge is between 7° and 35°;
      iv. a tiplet section root chord, wherein the tiplet section root chord is joined to the inner section tip chord, the tiplet section root chord and the inner section tip chord are having identical length and position, the airfoil of the inner section tip chord and the airfoil of the tiplet section root chord are identical;
      v. a tiplet section tip chord;
      vi. a taper ratio between the tiplet section tip chord and the tiplet section root chord is less than 0.1;
      vii. a tiplet section chord plane determined by the tiplet section straight leading edge and the tiplet section straight trailing edge, wherein the tiplet section chord plane is identical to the inner section chord plane;

viii. a tiplet section lift area, wherein the tiplet section lift area lies in the tiplet section chord plane, the tiplet section lift area is bound by the tiplet section straight leading edge, the tiplet section straight trailing edge, the tiplet section root chord, and the tiplet section tip chord, the tiplet section lift area is less than 12% of the inner section lift area;

ix. a tiplet section span extending from the tiplet section root chord to the tiplet section tip chord, wherein the tiplet section span is between 30% and 80% of the inner section span;

x. tiplet section cross sections in flight direction shaped as airfoils with thickness-to-chord ratio less than 6%, wherein the air pressure centers of the tiplet section cross sections are in front of 30% of the airfoils' chord lengths in cruise;

wherein the inner section and the tiplet section are having pivotal trailing edge flight control surfaces.

2. The aircraft wing with tiplet of claim 1, wherein the tiplet section lift area is gradually curving upward, whereby the tiplet section tip chord is elevated above the inner section chord plane by less than 15% of the tiplet section span.

3. The aircraft wing with tiplet of claim 1, wherein at least one portion of the tiplet section is variably folded up during takeoff, landing, and ground operations.

4. The aircraft wing with tiplet of claim 1, wherein the inner section straight trailing edge and the tiplet section straight trailing edge are respectively cut out before the intersect point at an inner section trailing edge cutout point and at a tiplet section trailing edge cutout point, the inner section trailing edge cutout point and the tiplet section trailing edge cutout point are joined with a transition section trailing edge straight line, whereby the inner section chord at the inner section trailing edge cutout point, the tiplet section chord at the tiplet section trailing edge cutout point, the aircraft wing with tiplet straight leading edge between the inner section chord at the inner section trailing edge cutout point and the tiplet section chord at the tiplet section trailing edge cutout point together with the transition section trailing edge straight line form a transition section of aircraft wing with tiplet, thus the inner section chord at the inner section trailing edge cutout point being a transition section root chord, the tiplet section chord at the tiplet section trailing edge cutout point being a transition section tip chord.

5. The aircraft wing with tiplet of claim 1, wherein the inner section straight trailing edge and the tiplet section straight trailing edge are respectively cut out before the intersect point at an inner section trailing edge cutout point and at a tiplet section trailing edge cutout point, the inner section trailing edge cutout point and the tiplet section trailing edge cutout point being joined with a trailing edge curved line, the trailing edge curved line tangentially joins the inner section straight trailing edge and the tiplet section straight trailing edge, whereby the inner section straight trailing edge before the inner section trailing edge cutout point, the trailing edge curved line, and the tiplet section straight trailing edge after the tiplet section trailing edge cutout point being the trailing edge of the aircraft wing with tiplet.

* * * * *